(12) United States Patent
Nesfield

(10) Patent No.: US 6,953,528 B2
(45) Date of Patent: Oct. 11, 2005

(54) FLOW CONTROL SUCTION BARRIER APPARATUS AND SYSTEM

(76) Inventor: Floyd E. Nesfield, 1290 Schenectady Ave., Brooklyn, NY (US) 11203

( * ) Notice: Subject to any disclaimer, the term of this patent is extended or adjusted under 35 U.S.C. 154(b) by 0 days.

(21) Appl. No.: 10/627,167

(22) Filed: Jul. 25, 2003

(65) Prior Publication Data

US 2005/0016930 A1 Jan. 27, 2005

(51) Int. Cl.⁷ .................................................. C02F 7/00
(52) U.S. Cl. ........................ 210/747; 210/801; 210/154; 210/162; 210/170; 210/532.1
(58) Field of Search ................................. 210/154, 162, 210/170, 521, 532.1, 747, 800, 801; 405/74

(56) References Cited

U.S. PATENT DOCUMENTS

| | | | | |
|---|---|---|---|---|
| 2,436,630 A | * | 2/1948 | Clegg | 210/170 |
| 3,013,395 A | * | 12/1961 | Gaylord | 210/532.1 |
| 3,693,796 A | * | 9/1972 | Michel et al. | 210/170 |
| 3,884,810 A | * | 5/1975 | Smyrnow | 210/170 |
| 4,397,503 A | * | 8/1983 | Williams | 405/74 |
| 5,298,172 A | * | 3/1994 | Smith | 210/154 |
| 6,042,733 A | * | 3/2000 | Tucker | 210/747 |
| 6,062,767 A | * | 5/2000 | Kizhnerman et al. | 210/521 |

OTHER PUBLICATIONS

IHC Holland Company website, Article: Modern dredging methods and their environmental aspect, 11 pages.

* cited by examiner

Primary Examiner—Christopher Upton
(74) Attorney, Agent, or Firm—Reed Smith LLP

(57) ABSTRACT

The preferred embodiment of the present invention is an inertial filtering device for filtering riverbed silt in a contained underwater environment comprising an enclosure to be placed underwater on a riverbed. The enclosure has at least one entrance opening located in the enclosure for allowing river water carrying riverbed silt to flow into the entrance opening. A chute for directing the river water upwards through the enclosure is also included in the enclosure. An exit opening is located at the top of the enclosure for exiting the river water. A hole is located in the chute for transiting particulate matter from the slit via gravity to the bottom of the enclosure while allowing the river water to proceed up the chute to the exit opening; and a suction device is connected to the bottom of the enclosure for suctioning out any matter collected in the bottom of the enclosure including PCBs or other pollutants.

16 Claims, 11 Drawing Sheets

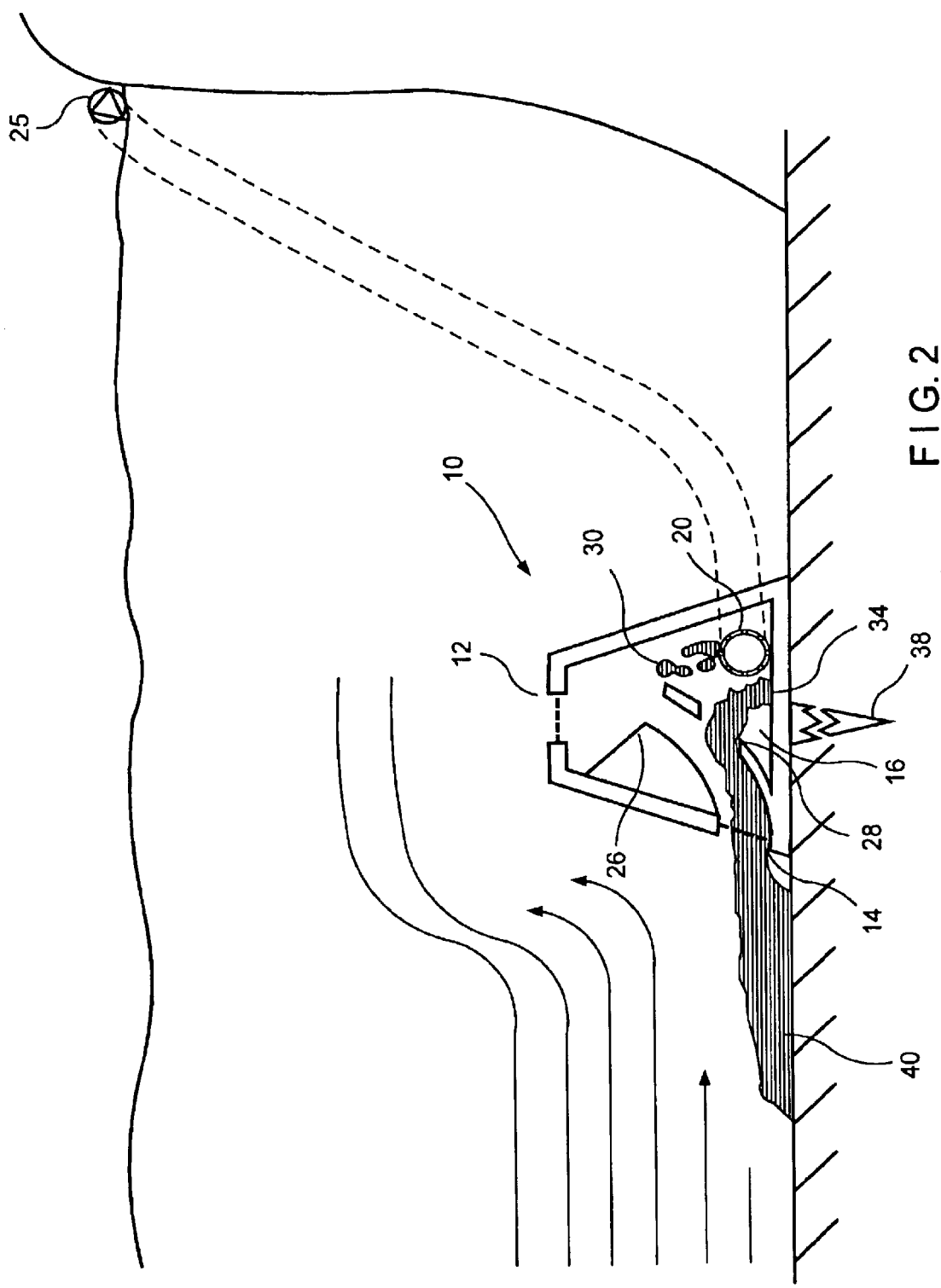

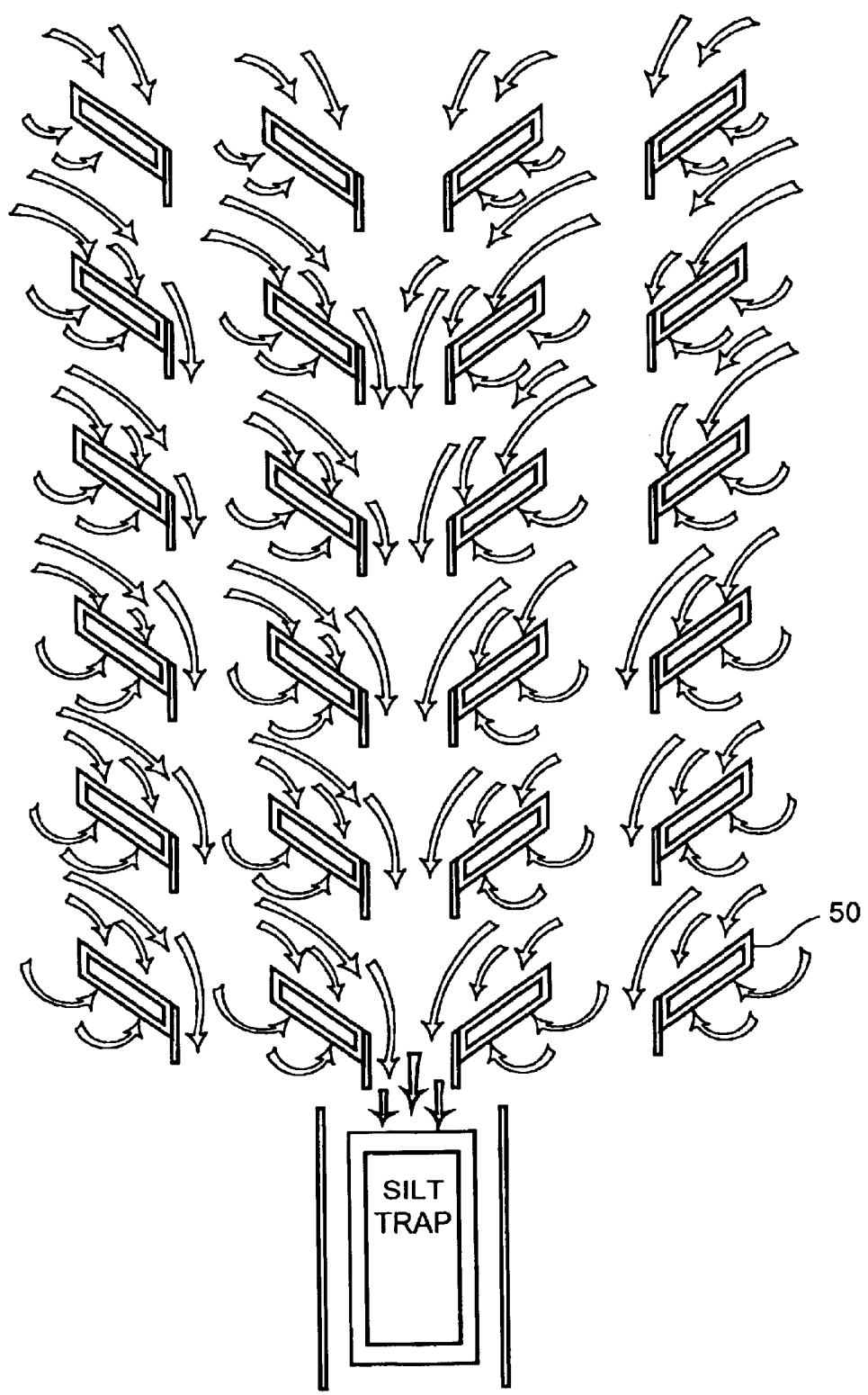
F I G. 7

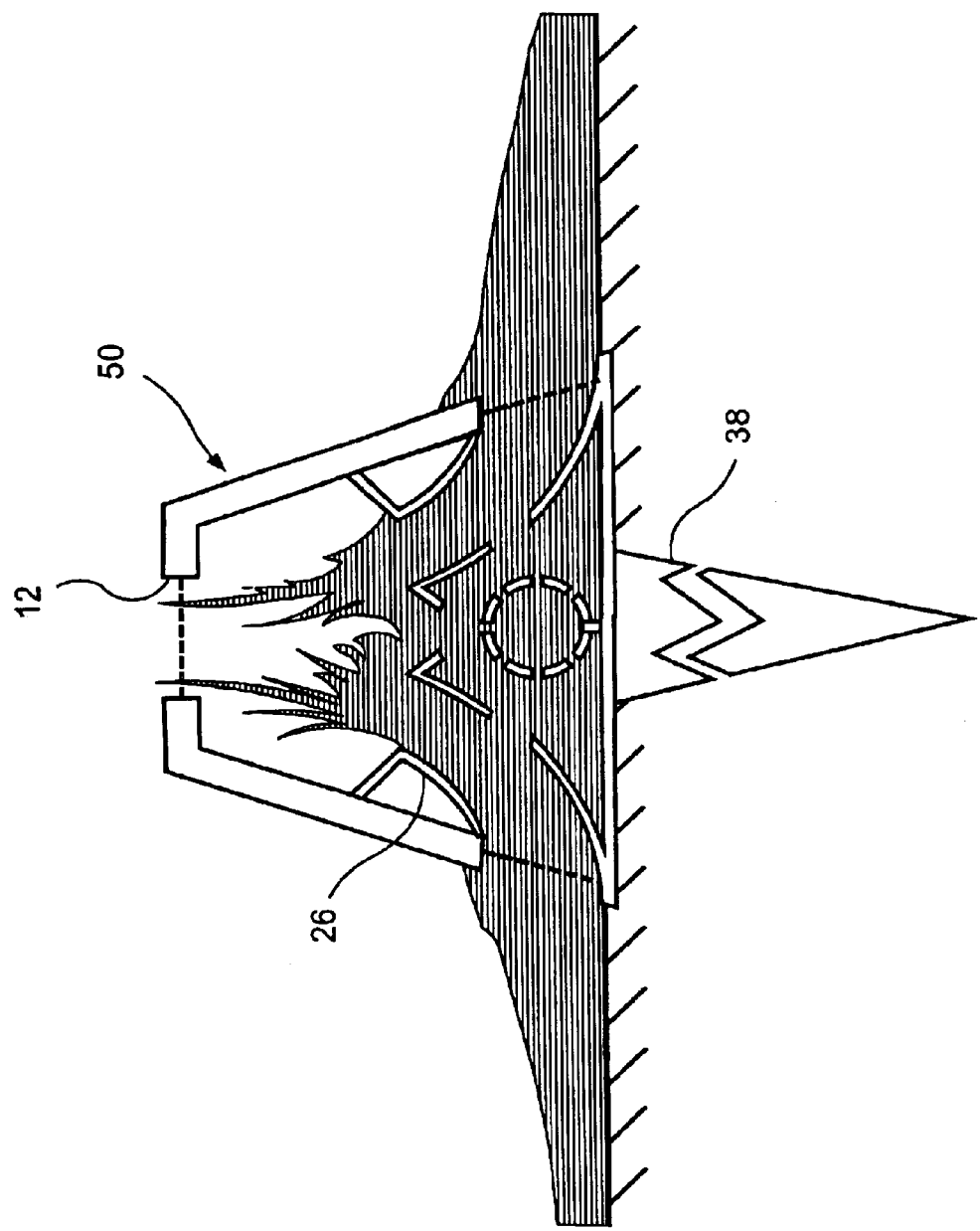

FLOW CONTROL SUCTION BARRIER APPARATUS AND SYSTEM

FIELD OF INVENTION

The invention is related to the field of environmental remediation. In particular, the invention is suitable for removing contaminated sludge from riverbed silt. For example, the invention is suitable for removing Polychlorinated Biphenyls (PCB) sludge, from the Hudson River in New York State.

BACKGROUND OF THE INVENTION

Currently, substantial resources are devoted to plans for cleaning river sediments of PCB's and other pollutants. The Hudson River, for example, has an EPA supervised PCB clean-up underway.

The following information is taken from public EPA materials (see www.epa.gov/hudson/pcbs101.htm). PCBs or polychlorinated biphenyls are a group of chemicals consisting of 209 individual compounds. PCBs were widely used as a fire preventive and insulator in the manufacture of transformers and capacitors because of their ability to withstand exceptionally high temperatures. PCBs were banned by the EPA in 1979, and are classified as a probable human carcinogen by numerous national and international health-protective organizations, such as the EPA, The Agency for Toxic Substances and Disease Registry (an arm of the U.S Public Health Service) and the World Health Organization. Research also links PCB exposure to developmental problems.

PCBs build up (bioaccumulate) in the environment, increasing in concentration as you move up the food chain. This is of special concern in areas where fish are exposed to PCB contamination and may be consumed by humans (as in the Hudson River).

There are 209 varieties of PCBs, known individually as congeners. A congener may have between 1 and 10 chlorine atoms, which may be located at various positions on the PCB molecule. For example:

monochlorobiphenyl=1 chlorine atom per molecule
dichlorobiphenyl=2 chlorine atoms per molecule
trichlorobiphenyl=3 chlorine atoms per molecule
tetrachlorobiphenyl=4 chlorine atoms per molecule
pentachlorobiphenyl=5 chlorine atoms per molecule
hexachlorobiphenyl=6 chlorine atoms per molecule
heptachlorobiphenyl=7 chlorine atoms per molecule
octachlorobiphenyl=8 chlorine atoms per molecule
nonachlorobiphenyl=9 chlorine atoms per molecule
decachlorobiphenyl=10 chlorine atoms per molecule A major problem is presented in that PCB's must be removed without causing further disbursement of the PCB's in the environment such as in the Hudson River. PCB's travel in river currents as they have an oil-like or sludge-like composition wherein they form a malleable and flowing sludge. However, PCB's are heavier than water and eventually settle in riverbeds as a sludge.

For example, one gallon of water weighs about 8.32 pounds whereas one gallon of PCB's weighs about 11.98 pounds. Riverbed silt is typically even heavier than the PCB's.

Traditional dredging techniques are not perfectly suited to handling and containing PCB's. Additionally, known methods of targeted pick-up of PCB's have deficiencies, for example "environmental dredging" wherein a grid with GPS coordinates is used is only effective for a short time period because other PCB sludges eventually migrate back to the site which was "cleaned." Therefore, a suitable PCB capable sediment filter is needed, and preferably a filter which can remain in its location for long periods of time, but that is also removable if needed and that does not impede river traffic or activities.

The transportation of sediments by the current of a waterway is determined by the properties of the sediment particles and the velocity and force of the current. The most important thing influencing the distance sediments can travel is the fall velocity. Fall velocity is experienced when a particle or particles is suspended and transported by a force, (in this case the natural current of the waterway). When the particle reaches a point were the suspending force acting on it is less than the gravitational force, the particle falls due to gravity. Differences in inertia between materials, density and shape also influence the fall velocity or settling rate.

Non-cohesive materials such as sand and limestone are formed as a loose collection of small particles. Cohesive materials are clay and mud which build up sediment flakes or flocs. Sediment flakes or flocs settle fast because of their weight and inertial difference compared to water. PCB's tend to form cohesive oil-like or sludge-like flakes.

Suspended sediments occur in various forms. In low sediment concentrations, the water can be regarded as water containing individual settling particles. In higher sediment concentrations, thick mud develops with water and sediment to form a homogenous mixture. This mixture sinks to the bottom of the riverbed, from there it spreads out horizontally (density flow). The heavy mud consolidates slowly and is difficult to filter. PCB's are carried in the sediments.

Dredging Methods

The following is public information cited from IHC Holland company website (see IDS). For the last decade, engineers have introduced many different methods to dredge rivers and canals. During this period, the main focus for dredging was and still is to increase the depth and width of the rivers and canals to accommodate the passage of vessels. Dredging causes turbidity in surrounding waters and, depending on the local currents, a large part of the dredged material can spread over a larger area. In the case of dredging polluted sediments, the impact on the environment due to turbidity and its dispersal can be disastrous. Polluted material like silt, mud or soft clay can be removed using different types of dredging equipment. The contaminated silt that is found in the river results from factories or plants near the banks of these rivers. In estuaries, where the sea and fresh water meet, sedimentation by flocculation will occur, accumulating the polluted materials.

Dredging Equipment

As previously indicated, the suitability of a type of dredger depends on the minimizing of turbidity, high accuracy in positioning the digging element, or suction entrance and the ability to remove the soil at the highest possible density. Briefly, representative types of dredging will be discussed below with indications of their application.

Trailing Suction Hopper Dredger

Very well suited to dredge soil like silt, mud or soft clay, which is usually in layers on top of materials of higher density like stiff clay. Accurate positioning of the drag head in the horizontal plane is difficult, indeed almost impossible. Vertical positioning is also difficult unless low densities are accepted or special equipment is installed. The separate dredging of soil of different contamination classes in small dredging sites is very difficult and use of a trailing suction hopper dredger is therefore limited in these situations. Turbidity of surrounding water is very high, depending on the acceptance of overflowing and the type of overflow system used, on the use of a light mixture overboard system, the trailing speed and on the rate of maneuvering.

Bucket Dredger

This is suitable to dredge a wide range of materials. The positioning of the bucket in both the horizontal and vertical plane is very accurate. A major problem is encountered when thin layers of contaminated soils are dredged above a non-polluted bed. For instance, if a bucket dredger with bucket of 800 liters is used to remove a silt layer of only 40 cm, the density of the dredged material will be very low, due to the size of the buckets. Turbidity of the surrounding water, even at low bucket speed, is high but in general lower than for a trailer. For consolidated and also polluted sediments like clay, it is probably the best solution.

Cutter Suction Dredger

This is suitable to dredge more or less the same soil as indicated for the bucket dredger. The positioning of the suction mouth is rather accurate but in soft materials it is less effective in dredging soil outside of the cutter range. Turbidity is very high with a cutter at work and low when the cutter is stopped, but in this case the density of the soil dredged is also very low. If possible, reduction of the cutter speed to minimize turbidity, will result in lower mixture densities unless low mixture velocities are accepted and permitted. The use of cutter dredgers is only recommended when soil are very cohesive turbidity is less important and when density and/or mixture velocities of the pumped material are of minor importance in a given situation.

Stationary Dredger

Due to the basic principles of this type of dredger it is only suitable for dredging contaminated silt in very thick layers, for instance deposits in deep pits. Positioning of the suction mouth rather poor but is not important when the dredger is working in silt trap with silt layers of 2 to 5 meters. This is unable to handle cohesive soils unless a jet system is installed at the suction mouth, but in such a case then turbidity of surrounding water is very high.

Grab Dredger (with Grab on Wires)

The positioning of grab dredger in the horizontal plane is very accurate in shallow waters without currents. Positioning in the vertical plane is very poor in currents and flat bottoms can not be produced by dredging unless special precautions are taken to compensate the vertical movement of the cutting parts of the grab itself when it is closed. If a fully closed grab is used, turbidity of surrounding water is minimal. In combination with a so-called "Silt Curtain" a grab dredger can provide a practical solution from an environmental point of view. Grab dredger (with grab hanging on controllable arm).

However vertical and horizontal positioning in excellent and dredging a flat bottom with the aid of microprocessor-controlled positioning system is very good. The unit permits accurate dredging in tidal areas with low moderate currents. Environmentally a very good solution. Unless high investments are made however, production is limited.

Backhoe Dredger

If special arrangements are made to close the bucket when it is filled with soil and before the bucket is moved to the surface. The fitting of an effective and safe closing device, however, will be a weak point in this system if the dredging site is contaminated by stones, wires, anchors, etc.

Dustpan Dredger

Dustpan dredgers are only suitable for on flat bottoms with thin layers of silt. In order to minimize turbidity the use of jet water is not recommended, but jetting water is required to draw in the silt over the full breadth of the suction mouth. Positioning in the vertical plane is good, while positioning in the horizontal plane is moderate, depending on the anchoring system. This type of dredging is not suitable for cohesive materials.

Wheel Suction Dredger

From an environmental point of view this is similar to the cutter dredger. Due to the larger diameter of the dredging wheel, turbidity in surrounding water is somewhat worse than for cutter dredgers.

Mechanical Agitation Dredging

A very simple system (FIG. 7) with low investments used to transport limited amounts of silt from the sides of a channel or harbor basin into deeper water. Usually the system is used to supplement other dredging equipment. The positioning of the system in the horizontal plane is very limited. Separate wires provided running to a hoisting gantry on aft side of the tugboat to adjust the dept of the agitation device. A high rate turbidity occurs if it is used in shallow waters due to propeller wake. If the system is used in deeper water, the accuracy of vertical positioning is limited, but at lower tug speed the turbidity of surrounding waters is rather low.

Agitation Dredging by Means of Water Injection

Such system is based on the principle that fluid silt behaves like water and run down a slope when it is fluidizer. When water is injected into the silt, the silt will run from the sides of the channel or harbor basin to deeper water where it can be dredged. Positioning horizontal and vertical plane is rather good, but penetration depth silt depends on the type of waterjets used and density and nature of the silt, which makes this dredging system complicated and the positioning accuracy worse.

Agitation dredging must not to be confused with the normal way of agitation dredging where turbidity is essential to transport the sol by means of the tidal (or river) current. This system cannot be used to remove polluted soil due to the excessive turbidity of surrounding waters.

Other Systems Related to Dredging

Besides the mentioned equipment normally used in dredging silt and other low-cohesive soil, other types of system have to be mentioned to complete this list of dredging equipment. They are more or less additional tools and of a more stationary character.

Silt Trap

A silt trap is a deepened part of the harbor or estuary arranged to strategic place where silt is trapped due to excellent settling conditions. The silt will accumulate in a thick layer below the nautical depth and can than be dredged at high production rates at low cost by normal dredging equipment like trailing suction hopper dredgers. The main feature of this system is to catch, as far as possible, polluted silt at one place where it can be dredged under the best environmental conditions. This can be reached for instance by means of a silt trap with a sloping bottom to a deep part of the trap outside the traffic lane where it can be dredged with the best environmentally acceptable dredger available. Depending on the capacity of the silt trap, the gap between two successive maintenance periods can vary from almost continuous to once a year or less.

Stationary Silt Pumping Station

In addition to the silt trap, tests have been done in the past to place a fixed suction mouth (or numbers of suction mouths) in the lower part of a silt trap with a stationary pumping station. The aim is to pump the silt at a constant and low production rate to a disposal site via a pipeline. Due to the low pumping capacity, pumping 24 hours a day, is needed to remove the silt and the absence of moving parts like cutters, this system can be a good solution for dredging silt in rivers with constant delivery of polluted silt at the docks or the estuary.

Silt Curtain(s)

Silt curtains are an additional tool for stationary systems like grab dredgers, backhoe dredgers, and stationary dredgers, wherein the turbidity is strictly limited to the inside of the curtain, reaching from the water level to the bottom. This system is positioned beside or in front of the dredger, or floating separately held in position by anchors. Depending on the shape and construction of the unit, the workable current is limited to approximately 0.3 metros per second.

The above mentioned list equipment is not complete but it contains most of the equipment used in dredging today. During the last decade a large number of small, special dredgers have being designed for dredging (and often also for processing) polluted silt. Most of them are design for special conditions of very small capacities and special type of pollutants and some have not been built. Well-proven systems, of which more than one has built, are very exceptional and only built on a small scale. To date information from impartial experts about these systems is not available.

Transport Systems

A short note about transport of the dredged material is included below. Basically there are three possibilities: transport by means of dredger itself (for example, a trailing suction hopper dredger), by means of a discharge line (for instance with a cutter suction dredger) or by means of barges (for instance loaded by means of a bucket dredger or grab dredger). The barge can be emptied by means of a grab, a pump or by dumping the material through bottom doors or by splitting the hull. If barges, or trailing suction hopper dredgers transport contaminated silt, special care has to taken to avoid spillage of the contaminated silt due to swell and waves during transport. Discharging of contaminated silt by barges or trailing hopper dredgers is recommended for non-or acceptable low-polluted silt only, unless dikes enclose special arrangements like silt curtains are provided at the disposal site or the site. If the contaminated silt is pumped to a storage pond, special precautions have to be made to trap the contaminants from the water flowing over the deposit weir.

SUMMARY OF THE INVENTION

The Flow Control Suction Barrier (FCSB) is an apparatus and system designed to be used for redirecting, altering, controlling, and removing polluted contaminated sediment from a riverbed without causing turbidity, without disturbing the flow or navigation of the river, and also by using the natural current of the waterway for the primary transport medium. Therefore, the present invention is a very environmentally contained and sound device, which can go unnoticed in a riverbed. The use of the natural current of the waterway to transport the contaminated sediment is a low cost method of moving sediment. Relatively simple equipment is used, with low investment and operating costs.

Another advantage of using the FCSB system is that sediment can be removed while maintaining the normal navigational and pleasure boating traffic flow at the same time. In contrast, conventional dredging creates the resuspension of sediments from the bed to the waterway, i.e, conventional methods of dredging cause the re-suspension and relocation of sediments downstream. Even when devices such a prior at silt fence as described above are used, the disturbed sediment is not confined sufficiently and the entire section of the river from the water level to the river bed is cordened off.

Additionally, by using several of the FCSB of the present invention in columns staggered on the riverbed, these problems can be reduced to close to zero turbidity. Once the sediment is mobilized, the possibilities for control of the sediments on the riverbed greatly increases. The FCSB are positioned at an angle like an underwater "jetty" that collects and directs the sediment to an area designed to trap and remove it. However, the materials, for example PCB's, to be removed from the river bed sediments need to be susceptible to transport by a water column, and the materials need to flow in the direction were the transported material is intended to go and where it does not interfere with other interests. The transportation of sediments of the present invention is based the fact that natural currents will transport the material and that the material can be gathered against the FCSB like an underwater jetty for processing.

BRIEF DESCRIPTION OF THE FIGURES

FIG. 2 shows a water flow diagram of the present invention;

FIGS. 6–7 show the present invention arranged in an array configuration; and

FIGS. 8–9 show a side view of the second embodiment present invention in operation.

DETAILED DESCRIPTION OF THE INVENTION

The Flow Control Suction Barrier (FCSB) 10 is preferably trapezoidal in shape, the preferred embodiment, although any shape which achieves proper water flow is acceptable. The FCSB may be constructed of concrete or any other suitable material. A typical size would be about 40' feet by 10'. A preferred embodiment is trapezoidal and has measurements which are approximately top=4'×40', bottom =10'×40', and sides 8' in height. On the top an exit opening 20 having dimensions 1'×20' is provided. On the sides a side opening(s) 14 having dimensions about 1.5"2' by 25' is provided.

The FCSB 10 is lowered to the riverbed by a barge with a crane and its position recorded by GPS coordinates. A suction hose is connected to the FCSB for removing the filtered contaminants which are captured in the FCSB, for example, PCB's. A spike 38 located on the bottom of the FCSB 10 is used to assist in holding the FCSB 10 in place in the riverbed.

Figure 1:
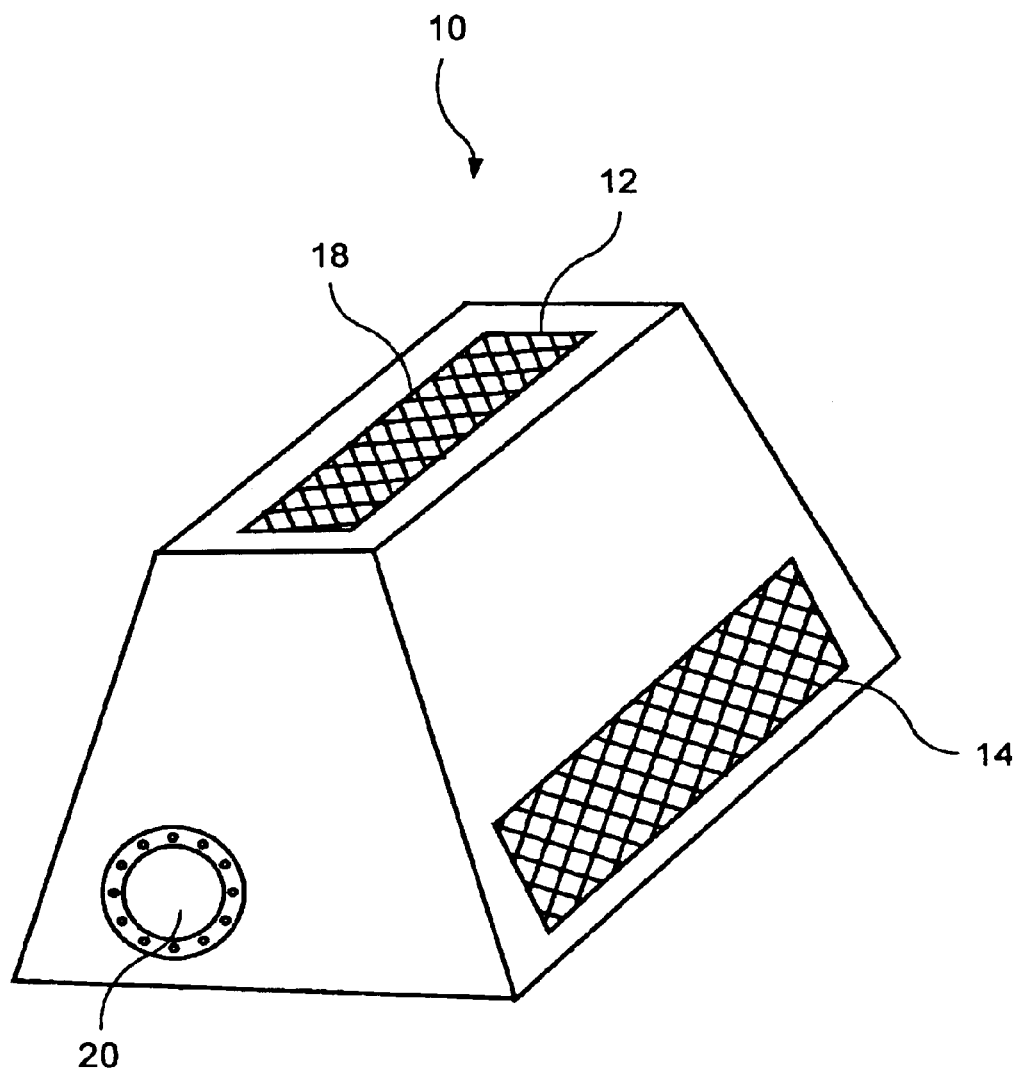
FIG. 1 shows the single side opening embodiment of the present invention.

The FCSB 10 is basically a trapezoidal enclosure with a flat bottom that has a series of openings, see FIG. 1. The FCSB forms a "barrier" on the riverbed much like an underwater jetty. In this way, sediment 40 builds up against and enters the FCSB 10 through the side opening 14 with the passing of river currents(see FIG. 5). There are at least two types of FCSB's according to the present invention, a single entry opening embodiment 10(see FIGS. 1 and 1A) designed for rivers with current flowing in only one direction, and a double entry opening FCSB embodiment 50(see FIG. 1B) designed for rivers with currents which flow in two directions such as the Hudson River, wherein in either case contaminants carried in the sediment enters the openings.

Figure 5:
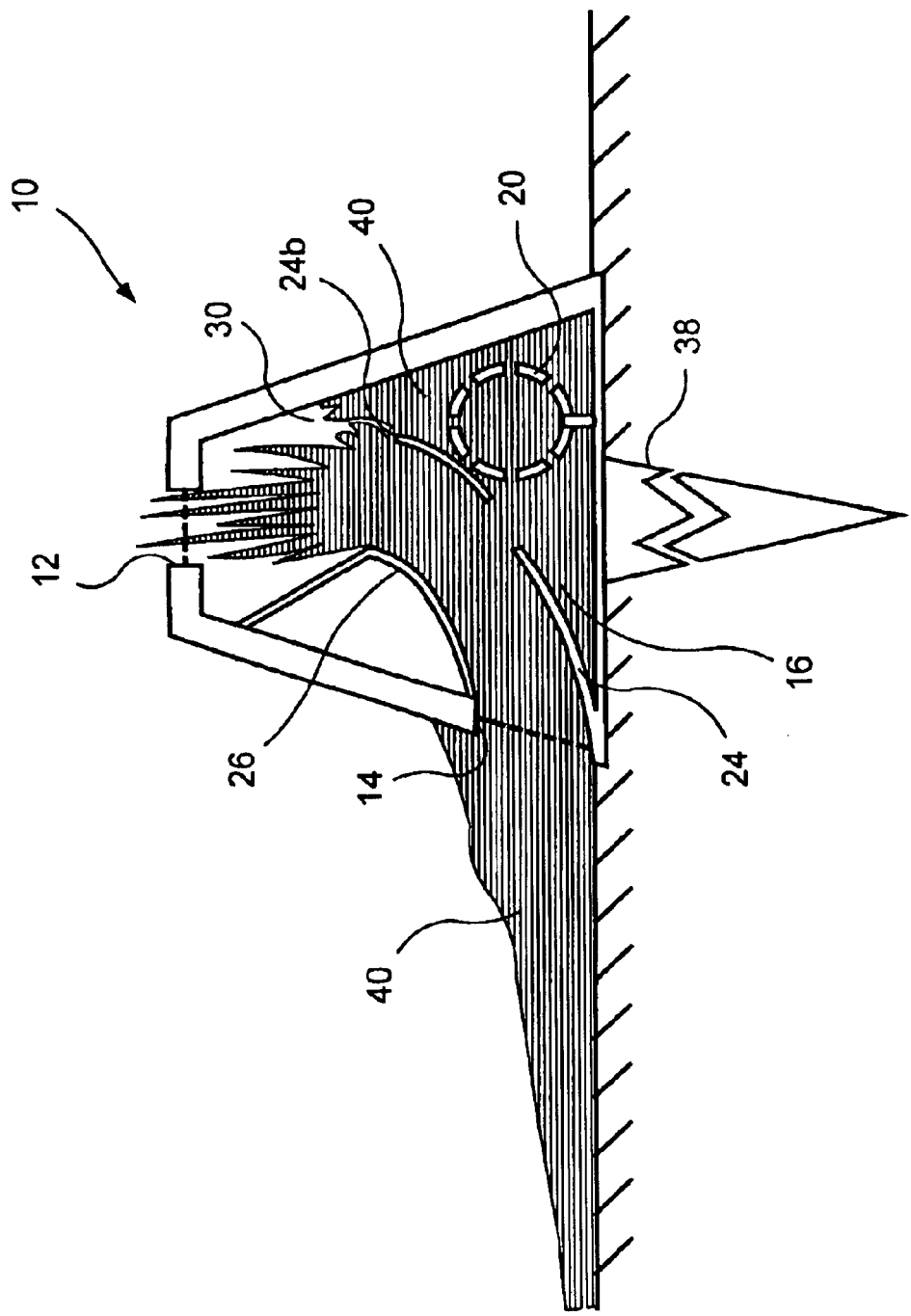

Referring to FIGS. 2 and 5, the filtering process occurs as follows. First sediment enters the side opening 14 due to river currents and also due in part to the "barrier effect" of placing the FCSB on the riverbed. Again, this is, the underwater "jetty" effect mentioned above and shown in FIGS. 2 and 5. The sediment contains for example PCB sludge which is heavier than the silt or other materials making up the sediment. For example, one gallon of water weighs about 8.32 pounds whereas one gallon of PCB's weighs about 11.98 pounds. Riverbed silt is typically even heavier than the PCB's. Therefore, the present invention uses differences in inertia to separate the PCB's from other materials of different weights.

Figure 1A:
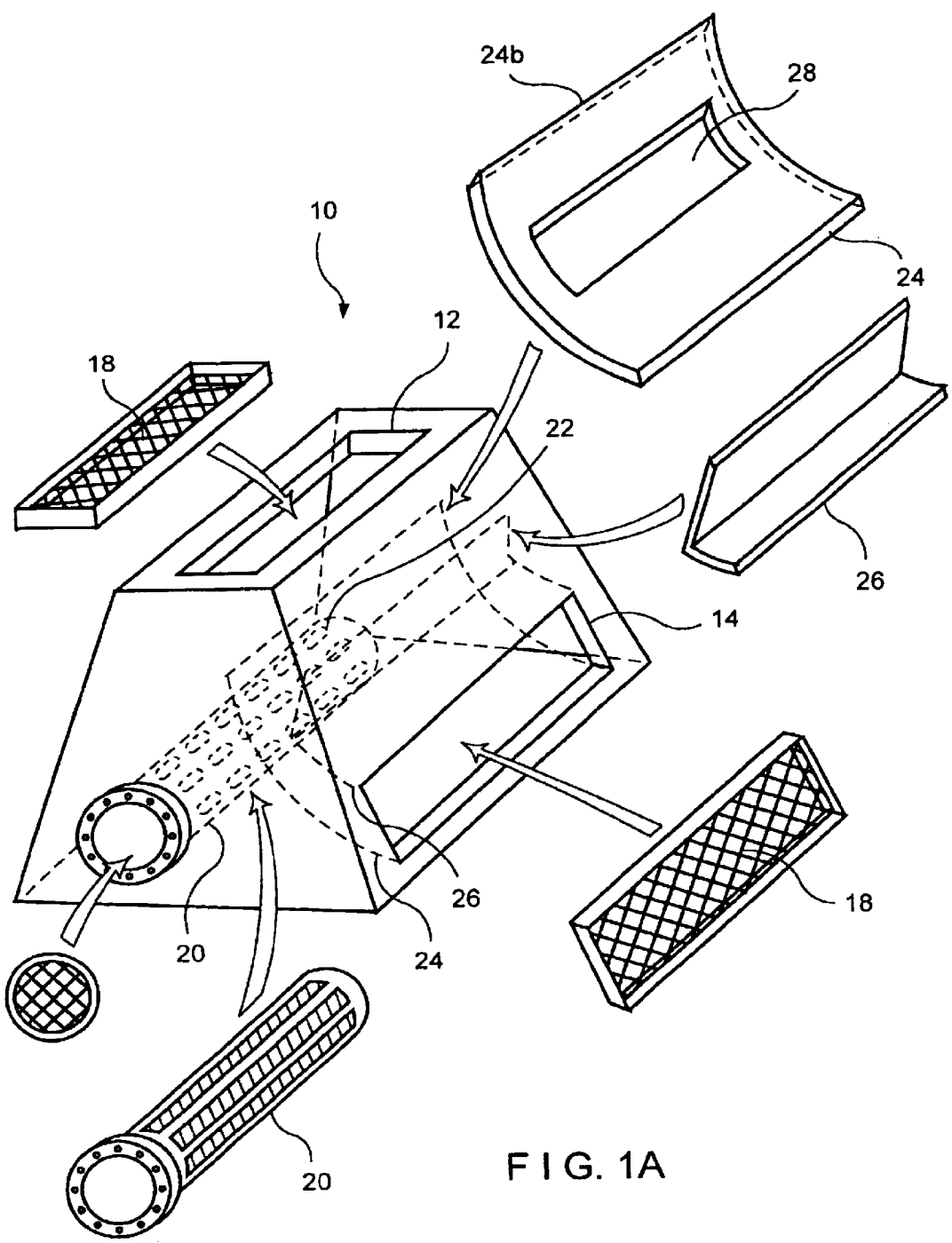
FIG. 1A shows an exploded view of the present invention.
Figure 1B:
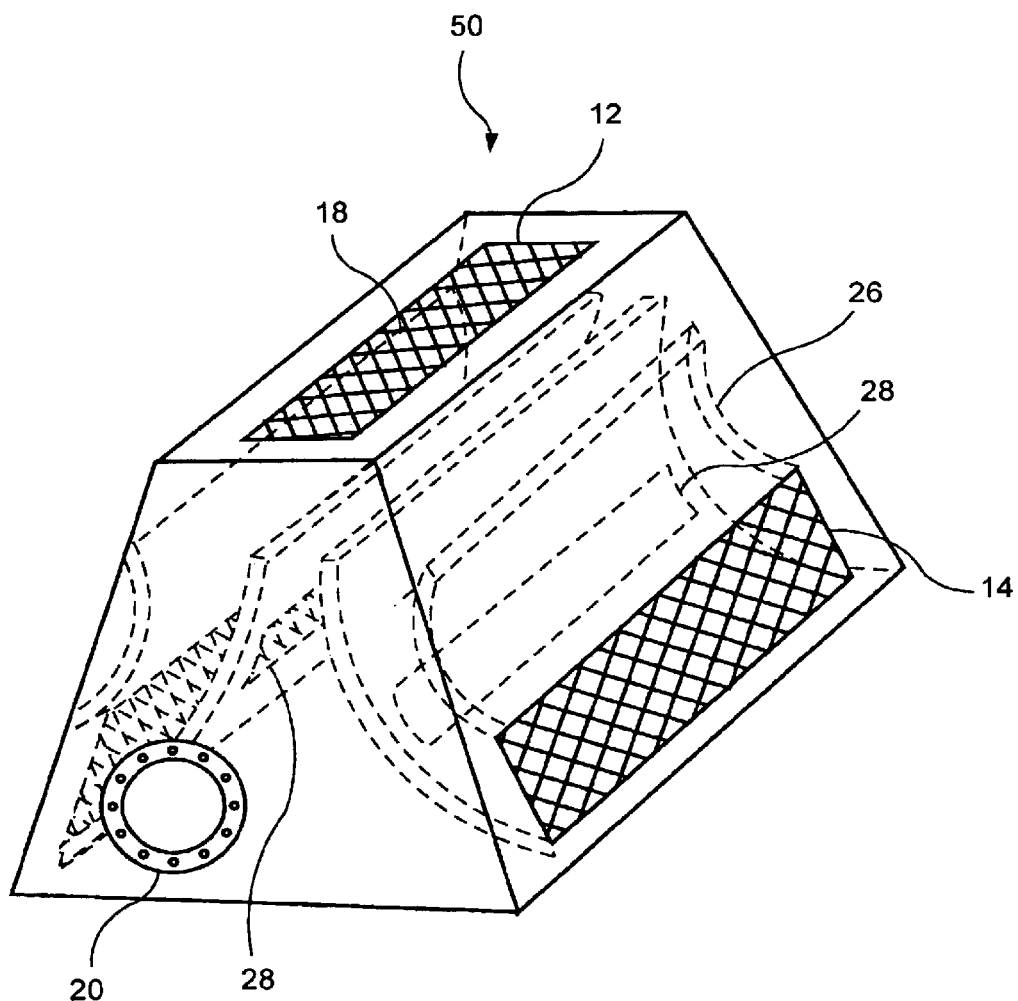
FIG. 1B shows the single side opening embodiment of the present invention.
Figure 3:
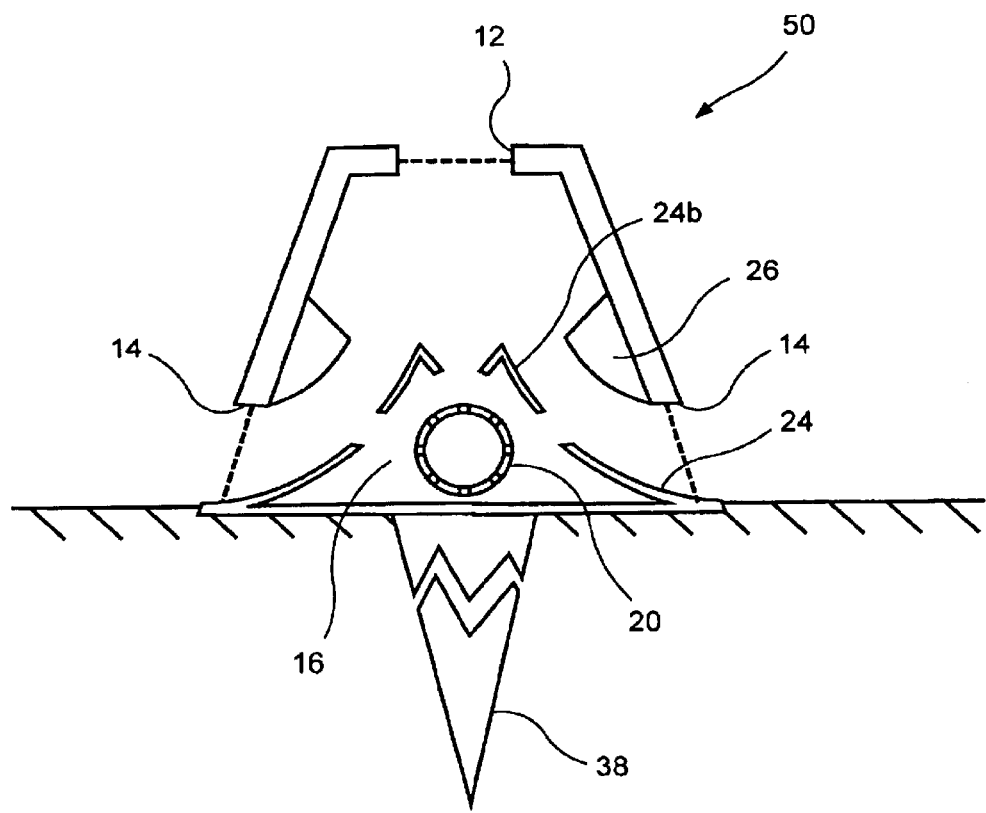
FIGS. 3–5 are side views of the present invention.
Figure 4:
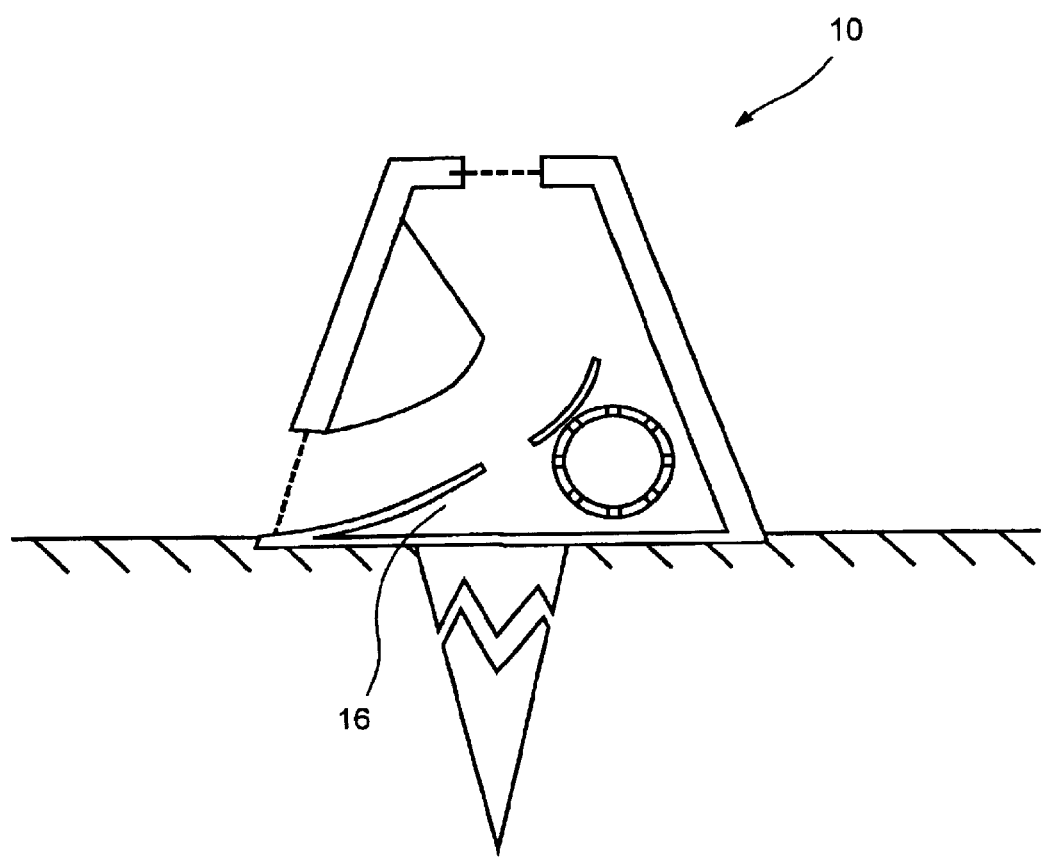

Referring to FIGS. 1a and 2, the watery sediment 40 enters the concave chute 24 which directs the sediment upwards towards the exit opening 12. A concave chute top piece 24 forms the top section of the travel path over which the watery sediment 40 travels. Lastly, the sediment exits the FCSB 10 through the exit opening 12. While the watery sediment 40 is transiting the internal path of the FCSB 10 as described above, the separation of the pollutants from the sediment also occurs as follows. As best seen in exploded FIGS. 1A and 2, a chute opening 28 is included in concave chute 24. When the watery sediment 40 enters the FCSB 10, the watery sediment, which is composed of lighter parts such as mud and also heavier parts such for example PCB sludge, passes chute opening 28 and due to flow of the water sediment and difference in inertia between water and the PCB's, gravity, and fall velocity (as discussed in the background) the net effect is that the heavier contaminated sludge 34 (for example PCB sludge) falls through chute opening 28 and is removed from the flow path of the watery sediment 40 in concave chute 24. The contaminated sludge 34 falls via gravity into bottom chamber 16. Bottom chamber 16 is subject to a suction force originating from suction pipe 20 which is connected to an external suction source such as a tube connected to a remote pump 25 located on the river bank as shown in FIG. 2.

Therefore, the contaminated sludge 34 which falls into a bottom chamber 16 is subsequently suctioned out of bottom chamber 16 via a suction pipe 20. This is called "first stage" separation according to method and structure of the present invention.

The second stage of pollutant or contaminated sludge 34 separation from the watery sediment 40 occurs when the watery sediment 40 traverses the concave chute top 24b and then heavier contaminated sludge 34 which has been carried past "first stage" chute opening 28 is separated at this "second stage" from the watery sediment 40 via gravity and falls into bottom chamber 16 through the open space or second chute 30 wherein it is suctioned out via suction tube 20 as discussed above in stage 1.

Each FCSB 10 includes a suction pipe 20 used for suctioning out any contaminant materials caught in the FCSB. This suction pipe 20 is routed through an outer wall of the FCSB 10 to a for example a tube connected to a suction pump located on the river bank (not shown). For example, if PCB sludge "balls" are trapped in the FCSB, the suction pipe 20 is used to suction the PCB sludge out of the FCSB through openings 22 and into an attached tube (not shown) for removal. Inside the FCSB, there are two concave shoots pointing upwards in the single FCSB and four in the double FCSB.

The FCSB also has screens or gratings 18 which prevent large particles from entering the device when it is suctioning. These screens are placed in the exit opening 12 and side openings 14 to prevent large items from getting into the FCSB, i.e., fish, etc.

The mud is like putty at times, and with the varying currents, the sediments become deposited in layers like layers of a cake. For example, in a typical river bed, there would be a layer of sand 1 ft to 3 ft. thick, then a layer of mud, then sand, etc.

The single opening FCSB is to be used in rivers were the current flow in one direction. The double opening FCSB is preferred in rivers like the Hudson River, wherein the direction of the current can change due to tidal effects.

Single Opening Flow Control Suction Barrier 10

The polluted sediment enters the FCSB 10 through the opening located at the lower part of an elongated side of the FCSB 10 (see FIG. 1). From there, it travels up a concave shaped cute 24 towards an exit opening 12 on the top of the FCSB 10. On the way up the concave chute 24, the heavy part of the polluted sediment falls through an opening cut out on the bottom part of the concave chute 24 and falls down towards the bottom of the FCSB (FIG. 2). The collected material, i.e., polluted particulates such as PCB's, will then be removed by suctioning through suction pipe 20. The lighter concentration of the polluted sediment may continue upward toward the exit opening 12 located at the top of the FCSB 10. Some additional particles may fall back down toward the suctioning pipe 20 as well.

Double Opening Flow Control Suction Barrier 50

The polluted sediment enters through the side opening(s) 14 located at the lower part on each side of the elongated side of the FCSB 10. From there, the sediment travels up towards an exit opening 12 on the top of the FCSB 10. On the way up the concave chute 24, the heavy part of the polluted sediment (which could include PCB particulates for example) falls through a chute opening 28 cut out of the bottom of each concave shaped chute 24 and the heavy part of the polluted sediment falls down towards the bottom of the FCSB (FIG. 1a). A chute top piece 26 is joined to the inner wall of the CSB 10 and forms the top of the concave chute 24.

The higher concentration of the polluted material will them be removed by suctioning through suction pipe 20 using an external suction pump (not shown). A typical pump would be a solid handling pump capable of dredging up to 200 cubic yards per hours and delivering material up to 3000 feet away. In a preferred embodiment the pump would be run between 4 and 8 hours a day for about 4 to 9 years, in order to let the watery sediment 40 replenish itself. The lighter concentration of the polluted sediment may continue upward toward the exit opening 12 located at the top of the FCSB 10. Additional, particles may fall back down toward the suction pipe 20 as well.

Flow Control Suction Barriers in Series

Figure 6:
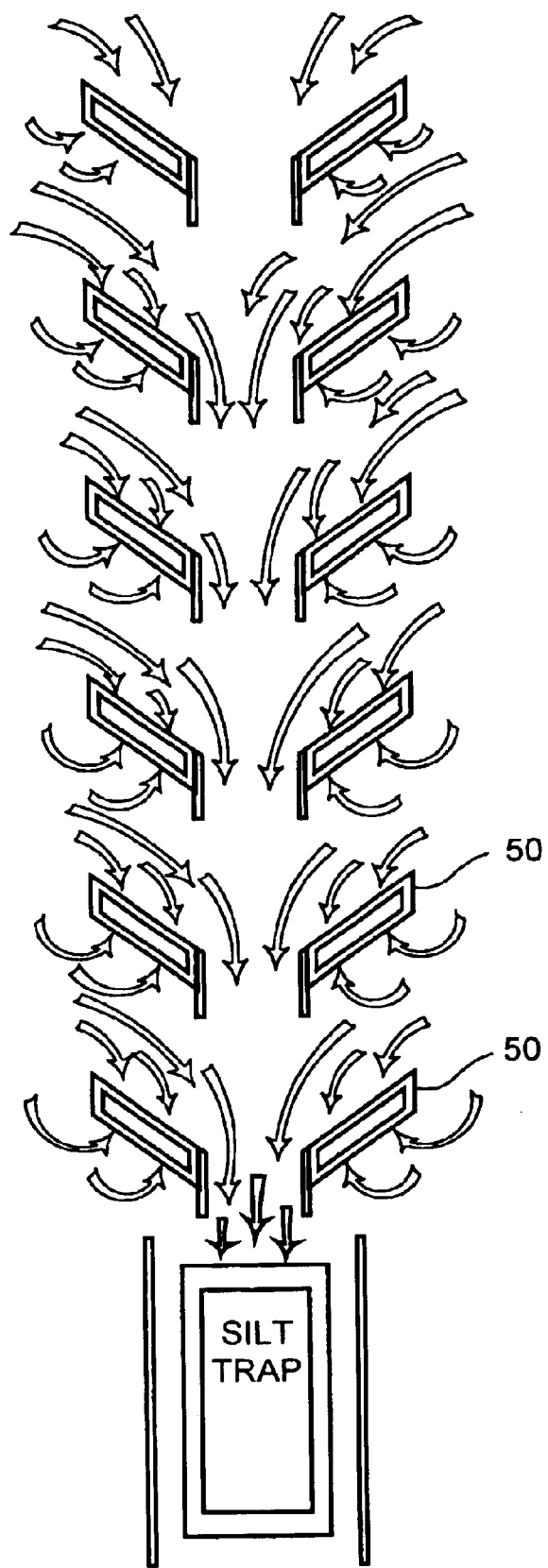
Figure 8:
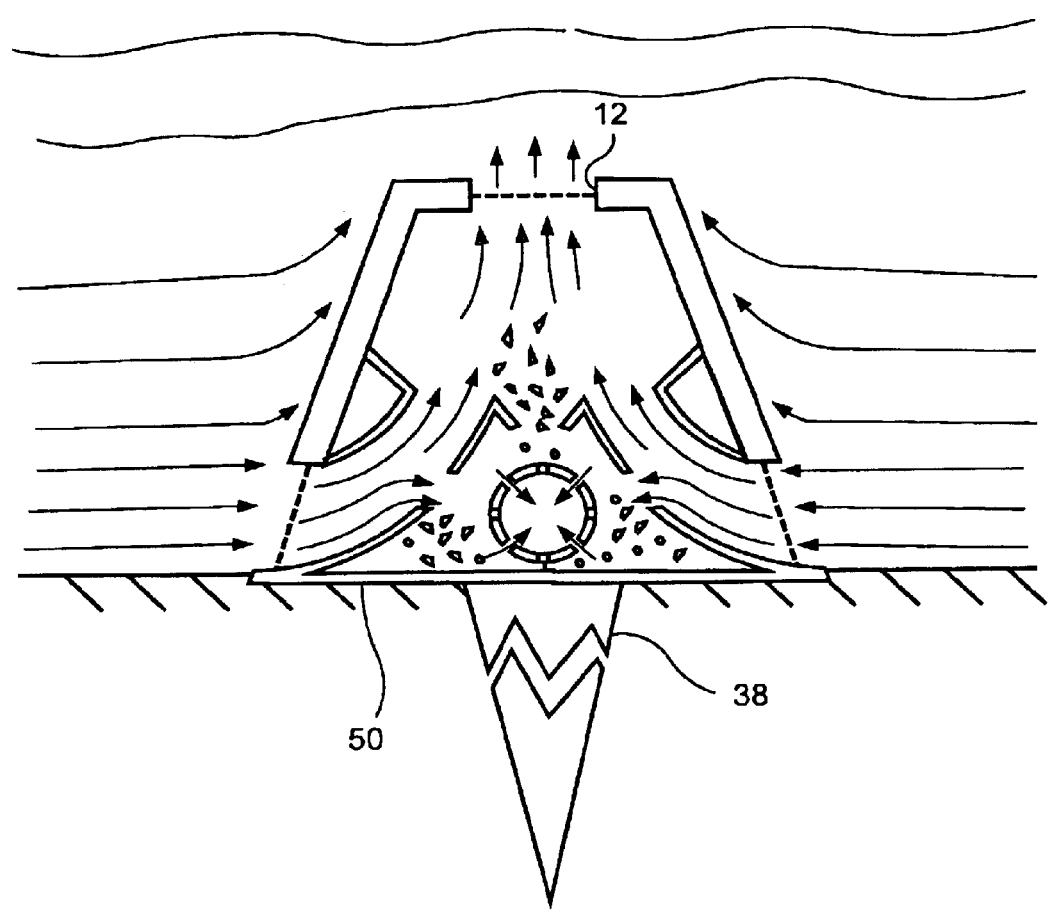

To achieve maximum efficiency, the Flow Control Suction Barrier should be used in columns staggered on the riverbed (see FIGS. 6–7). By using a staggered configuration, the natural current of the waterway, the polluted sediment can easily be transferred into one concentrated area which would make it easier to be removed. That is, if any particulates are caused to be dispersed into the river, a staggered array of FCSB's 10 will increase the likelihood of their retrieval.

The contaminated sediment would be redirected towards the center of the riverbed were it would be controlled and removed as it passes by the Flow Control Suction Barriers (FCSB's) 10. As the polluted sediment is passing through the Flow Control Suction Barriers(FCSB's) like an assembly line, the suctioning action would remove as much of the polluted sediment as is possible. If some of the polluted sediment gets past the front series of the FCSB's 10, it will be carried down-stream to be collected in the next series of FCSBs 10, and the process will begin all over again until the riverbed is satisfactory cleaned. If the FCSB's 10 do not collect all of the contaminated sediment, the last line of defense will be a silt trap (not shown) that's placed at the end of the run. The remaining contaminated sediment in the silt trap can be removed by environmental dredging.

A series of the enclosures may be strategically placed using a global positioning system (GPS) so that the array formed is mapped and adjusted to optimize the performance of the array (See FIG. 6).

To one skilled in the art, it will be apparent that the present invention envisions modifications and other embodiments as broadly disclosed above, and also embodiments other than those particularly illustrated and described herein without departing from the essential teachings of the present invention. Also, it should be very clear that the present invention can be used for filtering many types of pollutants other than PCB's and/or silt according the same principles.

What is claimed is:

1. A filtering device for filtering a riverbed of a river having natural river or tidal currents and a natural flow of silt or mud comprising:
   an enclosure to be placed underwater on the riverbed to create a partial barrier to the natural river or tidal currents and to create a partial barrier effect to the natural flow of silt or mud in the river but structured to rest unobtrusively on the riverbed so that navigation or the river itself is not obstructed by the enclosure and wherein turbidity of the silt or mud is substantially not created in the river due to containment provided by the enclosure;
   at least one entrance opening located in the enclosure for allowing river water carrying riverbed silt or mud to flow into the entrance opening via the natural river or tidal currents and via the partial barrier effect to the natural flow of silt or mud in the river;
   a chute for directing the river water upwards through the interior of the enclosure;
   an exit opening located at the top of the enclosure for exiting the river water from the enclosure;
   a hole located in the chute for separating the silt or mud via inertia, gravity, and differences in weight between the river water and the mud or silt, to the bottom of the enclosure while directing the river water to proceed up the chute to the exit opening; and
   a suction device connected to the bottom of the enclosure for suctioning out any silt or mud collected in the bottom of the enclosure.

2. The filtering device of claim 1 wherein:
   the enclosure is trapezoidal in shape and made of concrete.

3. The filtering device of claim 1 wherein:
   a second chute is located before the exit opening in order to provide a second filtering step and to separate more of the silt or mud from the river water.

4. The filtering device of claim 1 wherein the chute is dimensioned to filter PCB matter carried with the silt or mud.

5. The filtering device of claim 1 further comprising:
   a plurality of the enclosures placed in an array so that additional water borne silt can be filtered and directed amongst the array of enclosures.

6. The filtering device of claim 1, wherein the suction source is a powered pump located downstream from the enclosure to augment the natural current flow and to drive the water through the enclosure.

7. A device for filtering water borne silt from water in a waterway having natural water currents and a natural flow of silt in the waterway comprising:
   an enclosure placed underwater on the bottom of the waterway to form a partial barrier to the natural water currents and a partial barrier to the natural flow of silt at the bottom of the waterway wherein the enclosure is dimensioned so that navigation or the waterway itself is not obstructed;
   at least one entrance opening located in the enclosure for allowing water to flow via the natural water currents so that the water borne silt flows into the entrance opening;
   a chute for directing the water and the water borne silt upwards through the interior of the enclosure using the natural water currents;
   an exit opening located at the top of the enclosure for exiting the water; and
   a hole in the chute for filtering the water in the chute by separating the water borne silt from the water via gravity and via inertia, and for directing the separated water borne silt to the bottom of the enclosure while also allowing the water to proceed up the chute to an exit opening without causing excessive turbidity.

8. The device of claim 7, further comprising a powered pump located downstream from the enclosure and connected to the bottom of the enclosure to augment the natural current flow and to drive the water through the enclosure.

9. The device of claim 7 further comprising:
   a plurality of the enclosures placed in an array so that additional water borne silt can be filtered and directed amongst the array of enclosures.

10. A method for filtering water borne silt from water in a waterway having natural water currents and a natural flow of silt in the waterway comprising:
    placing an enclosure underwater on the bottom of the waterway to form a partial barrier to the natural water currents and a partial barrier to the natural flow of silt at the bottom of the waterway wherein navigation or the waterway itself is not obstructed;
    allowing water to flow via the natural water currents through at least one entrance opening located in the enclosure so that the water borne silt flows into the entrance opening;
    directing the water to a chute for directing the water and the water borne silt upwards through the interior of the enclosure using the natural water currents;
    placing an exit opening located at the top of the enclosure for exiting the water; and
    filtering the water by placing a hole in the chute for separating the water borne silt from the water via gravity and via inertia, and for directing the separated water borne silt to the bottom of the enclosure while also allowing the water to proceed up the chute to the exit opening.

11. The method of claim 10 further comprising:
    suctioning out the separated water borne silt collected in the bottom of the enclosure via a suction device connected to the bottom of the enclosure.

12. The method of claim 11 comprising:
    suctioning out the separated water borne silt collected in the bottom of the enclosure via a suction device connected to the bottom of the enclosure for a time period of about four hours every day;

allowing the enclosure to refill with water borne silt.

13. The method of claim 10 comprising:

placing a plurality of the enclosures in an array so that additional water borne silt can be filtered and directed amongst the enclosures.

14. The method of claim 13 further comprising:

strategically placing the plurality of enclosures using a global positioning system so that the array formed is mapped and adjusted to optimize the performance of the array.

15. The method of claim 10 further comprising:

leaving the enclosure underwater for a period of months or years.

16. The method of claim 10 further comprising:

an additional filtering step wherein any of the water borne silt which is not separated at the chute opening proceeds upward and is separated via gravity and inertia from the water by a second chute opening located before the exit opening.

* * * * *